United States Patent Office

3,703,482
Patented Nov. 21, 1972

3,703,482
POLYURETHANE FOAM
Fred A. Coglianese, Hackettstown, and John E. McCorkle, Somerville, N.J., assignors to Johns-Manville Corporation, New York, N.Y.
No Drawing. Continuation-in-part of application Ser. No. 102,375, Apr. 12, 1961. This application Mar. 15, 1962, Ser. No. 180,007
Int. Cl. C08g 22/04
U.S. Cl. 260—2.5 AK          9 Claims

ABSTRACT OF THE DISCLOSURE

The invention relates to the polyurethane foam art and comprises producing polyurethane foams wherein a wood resin containing active hydrogens is incorporated into either or both of the polymerizable foam ingredients.

This invention relates to polyurethane foam compositions, methods of making polyurethane foams and structural elements formed therefrom. More particularly, it relates to the method of making inexpensive, low density polyurethane foams on the order of 0.5 to 15.0 lbs./cu. ft., by incorporating particular additives therein. Specifically, this invention relates to the production of modified polyurethane foams particularly adapted for insulating purposes, characterized by low cost, yet exhibiting a thermal conductivity at least equivalent to that of the unmodified polyurethane foam. The invention is primarily applicable to rigid closed cell foam formulations, but it has been demonstrated equally suitable for open cell foam.

This application is a continuation-in-part of U.S. patent application, Ser. No. 102,375 filed Apr. 12, 1961, now abandoned.

HISTORY

Before the introduction of polyurethane foams, various methods and compositions had been employed to produce cellular or foamed rubbers and plastics. However, many of these prior procedures had the disadvantages of being exceedingly complicated and/or requiring extensive processing equipment. For example, the manufacturer was usually limited to physical manipulations dependent upon the particular materials used. The major disadvantage of the majority of these materials was their incapability of direct introduction into a cavity and subsequently foaming in situ. In other words, the materials had to be manufactured and shaped to the desired article in one location and subsequently attached to the structure to which it was intended. Not only were these additional process steps expensive, but they were obviously time consuming. Moreover, even if the on site foaming was not desired, the early materials were considered to lack good physical properties in addition to good cost factors.

With the advent of the polyurethane materials, the majority of these disadvantages were overcome as it became possible to add the individual constituents at the site of their ultimate use and foam in situ. Coupled with the outstanding adhesion of the urethanes to almost all surfaces, it became readily apparent that such were destined for extreme commercial success, for at least it had become possible to control the final formation or polymerization of a foam and thus effectively tailor the foam to the exact requirements of density, shape, hardness, etc., by means heretofore impossible or exceedingly impractical.

The polyurethanes are generally produced by reacting an isocyanate with an alcohol; both the isocyanate and the alcohol may be multifunctional to permit proper polymerization. Both polyether and polyester isocyanate foams have been produced. This may be accomplished by reacting various non-linear, slightly branched polyesters with the diisocyanate or by reacting a linear polyester with mixtures of di- and triisocyanates. The use of the diisocyanate permits a bifunctional molecule to be available which can serve as a polymerizing agent when reacted with another molecule containing more than one functional group, each group having at least one active or labile hydrogen atom. Generally an excess of the polyisocyanate is required in order to generate an amount of carbon dioxide necessary for forming the cells in the final product. A small amount of water is likewise present to cooperate with the isocyanate to form the carbon dioxide. Sufficient amounts of diisocyanate are also necessary to build up the polyester to a high molecular weight and in order to sufficiently cross-link the polyester.

Another method of forming the cellular structure has been subsequently devised wherein a low boiling point liquid blowing agent, such as a volatile fluorocarbon, may be added to the polyester and the blowing agents used as the means of foaming the polyurethane. This is generally performed in the absence of water or carboxylic groups.

The gas generated during the foaming process and intensified within the cellular structure results in a very low thermal conductivity, thus making the polyurethanes extremely adaptable as thermal insulation. K values at 75° F. range from about 0.14 to about 0.30 B.t.u.-in./hr. sq. ft. ° F. This varies directly as the density is changed, the K values of 0.14 and 0.30 corresponding approximately to densities of 2 lb./cu. ft. and 15 lb./cu. ft., respectively. Moreover, heretofore the K factor also increased as the density was decreased below 2 lb./cu. ft. Thus the optimum density-K factor relationship was at a density of 2 lb./cu. ft.

Another difficulty previously encountered with the low density polyurethane foam compositions has been the inability to resist hydrolytic deformation. That is, at high humidity, such as 100 R.H., at 100° F. there are noticeable deflection and similar deformation in foam stock.

The use of polyurethane foams as insulating materials has chiefly relied on the use of closed cell structure which provides a rigid article. However, open cell structures have also been beneficially used as in the packaging industry in the form of flexible foams of similar densities.

While the polyurethane foams have exhibited K factors superior to other foam materials, such as polystyrene foam, they have, nevertheless, met with commercial resistance due to their relatively high cost. Efforts have been made in many directions to reduce the cost of the polyurethane by decreasing the density and by the incorporation of fillers or extenders. However, to date very little success has been achieved using fillers for various reasons. The disadvantage generally associated with the fillers has been the impossibility to achieve a reduction of cost of urethane while still retaining the desired properties in the final product.

The first efforts were directed along the lines of incorporating inorganic fillers. However, most of these behaved in the same manner by causing the foam to be more friable. In addition to being difficult to incorporate throughout the foam, thixotropic effects were produced making it rather impractical to handle or mix the compositions. Because of the unfavorable results due to the use of inorganic additives, this approach has been generally abandoned. However, no other materials have been found which may be used as a filler achieving a cost reduction without affecting the ultimate properties of the foam.

It was therefore because of these many problems and others that the instant invention was developed. It has now been found that a low density polyurethane foam on the order of 0.5 to 15.0 lbs./cu. ft., may be produced possessed of excellent thermal conductivity properties while remaining economically competitive with other materials by incorporating a solid or semi-solid and reactive wood resin in one or both of the polymerizable foam ingredients, i.e., the polyisocyanate or polyol and foaming in the conventional manner.

OBJECTS

It was accordingly a principal object of this invention to provide a new polyurethane foam composition overcoming the aforementioned disadvantages.

It was another object of this invention to provide a polyurethane foam composition which is low in cost while possessing good physical properties.

It was a further object of this invention to provide inexpensive polyurethane foam compositions characterized by low K factors.

It was another object of this invention to provide a method of producing commercially acceptable polyurethane foams low in cost yet usable in the same manner as those now available.

It was a further object of this invention to provide a new polyurethane foam material which is competitive cost-wise with presently available foam materials and is further characterized as possessing low thermal conductivity factors.

It was another object of this invention to provide a polyurethane foam composition characterized by improved hydrolytic stability at low densities.

It was another object of this invention to provide a more economical polyurethane foam composition capable of open and/or closed cell formation so as to be competitive with existing materials.

Other objects and further scope of applicability of the present invention will become apparent from the detailed description given hereinafter.

BRIEF DESCRIPTION OF THE INVENTION

It has been discovered that the above-mentioned disadvantages may be overcome and a low cost, low K factor polyurethane low density foam on the order of 0.5 to 15.0 lbs./cu. ft. produced by the incorporation of a wood resin containing active hydrogens, in either or both of the polymerizable foam ingredients. More particularly it has been discovered that if various hydroxylated wood resins such as wood rosin are solubilized in one or both of the conventional polymerizable polyurethane foam ingredients, it is possible to produce a foam with not only substantial reduction in cost but also a surprise reduction in the K factor particularly at densities below 2 lbs./cu. ft. Improved products are obtainable in both open and closed cell formations.

According to the instant invention there is provided a method of making polyurethane foam from polyols selected from the group of castor oil, polyesters, polyethers or mixtures thereof, a polyisocyanate having at least two functional isocyanato groups, and active hydrogen containing wood resin. By the term "wood resin," as used herein and in the appended claims, it is meant the non-cellulosic residues of distillation, extraction or refining of wood, particularly pine, and includes but it not limited to wood rosin and tall oil pitch.

DETAILED DESCRIPTION OF THE INVENTION

The following examples represent typical formulations incorporating various wood resin products. The polyurethane constituents were added by the conventional one-shot method or the quasi-prepolymer technique, as described more fully in connection with the examples, and the foam product was subjected to various physical tests including determination of density, compressive strength and K factor. The test results are recorded below in Table 1. In the following examples all figures refer to parts by weight unless otherwise indicated.

EXAMPLE I

The conventional one-shot technique was used to prepare the polyurethane foam. Forty-eight parts of a 80/20 mixture of toluene-2,4-diisocyanate and toluene-2,6-diisocyanate was mixed thoroughly with 0.5 part of an organosilicon surfactant. Fifty parts of Belro resin, a wood resin derivative, manufactured and sold under that trademark, was melted and mixed with 50 parts of a preheated polyol G–2410, a sorbitol propylene oxide polyether manufactured by Atlas Powder Company and having a hydroxyl number between 450 to 500, 8.9 parts of a pentakis hydroxypropyl dimer of ethylene diamine, and 0.5 part tetramethyl guanidine. This mixture was further heated until it becomes homogeneous and devoid of lumps. The mixture was then allowed to cool and 1 part of a stannous-type catalyst and 30 parts of a monofluoro trichloromethane were added. The diisocyanate component and the polyol component were then mixed together for 15 seconds and allowed to foam. A post cure at 200° F. for 10 to 20 minutes further expanded and hardened the foam.

EXAMPLE II

A foam was prepared by the one-shot technique as described above in Example I, wherein the polyether and the diisocyanate were increased to 250 and 190 parts, respectively. Twenty-five parts of Vinsol, a solvent extraction from the destructive distillation of pine wood, manufactured and sold under that trademark, was used in place of the Belro resin. The surfactant was increased to 5 parts and the catalyst charge changed to 2.5 parts of triethylene diamine. The foam was produced in the same manner as above.

EXAMPLE III

Again the one-shot technique was employed to produce a foam. Herein 177 parts of the diisocyanate was mixed with 2.5 parts of the surfactant. Sixty-one and one-half parts of the sorbitol polyether were mixed with 110 parts of a nitrogen containing polyether resin, N,N,N',N'-tetrakis (2-hydroxypropyl ethylenediamine), and 250 parts of a tall oil pitch. The mixture was heated until homogeneous and subsequently cooled. Two and one-half parts of the stannous catalyst and 125 parts of the blowing agent were then added. This mixture was thoroughly agitated and combined with the diisocyanate components. It was thoroughly mixed for about 15 seconds and allowed to foam.

EXAMPLE IV

In this example the quasi-prepolymer technique was employed. The general procedure involved is more clearly defined hereinafter. Here 221 parts of diisocyanate were charged into a resin kettle, agitated and heated to 150° F. One hundred and sixty-five parts of Newport Solo LMPX resin, a resin recovered from wood resin refining, was premelted to about 300° F. and added to the diisocyanate in increments so as to maintain the temperature of the kettle at 170° F.±10° F. Upon completion of the addition of the resin modifier, the reaction mass was cooled and dumped. The other components, the catalyst, blowing agent, polyol, were the same as those disclosed in Example III and were all mixed together with the remaining 165 parts of the Newport Solo resin. A foam was then prepared by mixing one part by weight of the quasi-prepolymer with the 1.46 parts by weight of the polyol premix. The components were then vigorously mixed for 30 seconds, poured and post-cured for ½ hr. at 200° F.

EXAMPLE V

A quasi-prepolymer technique was used to produce a foam using the same procedure as described above in Example IV, wherein the Newport Solo resin was substituted by Crosby 900. The Crosby 900 is a thermoplastic resin recovered from the wood resin refining process, manufactured and sold by Crosby Chemicals, Inc.

EXAMPLE VI

A quasi-prepolymer technique was used to produce a foam using the same procedure as described above in Example IV, wherein the Newport Solo resin was replaced by a plasticized Vinsol resin.

EXAMPLE VII

A quasi-prepolymer technique was used to produce a foam using the same procedure as described above in Example IV, wherein the Newport Solo resin was replaced by the Belro resin.

EXAMPLE VIII

In this example a flexible foam was prepared via the one-shot technique. Herein a resin blend was prepared using 1,020 parts of a high molecular weight diol polyether resin, 82.5 parts of a nitrogen containing polyether resin of high functionality, 600 parts of a wood resin, Crosby 900, and 155 parts of monofluorotrichloromethane. To this blend was added 10 parts of a silicone cell modifier and 15 parts of a stannous-type catalyst. To 200 parts of the above blend was added, while mixing, 21 parts of a crude toluene diisocyanate.

EXAMPLE IX

Example VIII was repeated using tall oil pitch in place of Crosby 900 with a successful flexible foam being produced.

TABLE 1

| Formulation | Density (pounds per cubic foot) | 5% deflection compressive (lbs./square inch) | K factor |
| --- | --- | --- | --- |
| Typical urethane | 2.0 | 35–40 | 0.14 |
| #1 | 1.6 | 20–25 | 0.15 |
| #2 | 1.21 | 6–8 | 0.18 |
| #3 | 1.7 | 8–10 | 0.28 |
| #4 | 1.6 | 20–25 | 0.15 |
| #5 | 1.6 | 20–25 | 0.15 |
| #6 | 1.6 | 20–25 | 0.15 |
| #7 | 1.2 | 13–17 | 0.19 |

From the foregoing data it is apparent that substantial cost reductions are now possible in polyurethane foams. Moreover, the benefit of cost reduction is very surprisingly accompanied by other benefits, such as a lowering of K factor for a given density and improved hydrolytic stability. This is especially true in densities below 2 lbs./cu. ft. Heretofore the optimum density for cost per board foot per insulating value has been 2 lbs./cu. ft. Attention is directed to Table 2 below which shows an average unmodified foam from a sorbitol propylene oxide polyether-toluene diisocyanate prepolymer system and the relation between density and K factor. The K factors therein for densities below 2 lbs./cu. ft. should be compared with those of the instant invention as illustrated by Table 1.

TABLE 2

| Sample | Density, lbs./cu. ft. Nominal | Test | K factor |
| --- | --- | --- | --- |
| Unmodified prepolymer system: | | | |
| 1 | 1.1 | 1.04 | 0.245 |
| 2 | 1.4 | 1.30 | 0.202 |
| 3 | 1.8 | 1.85 | 0.170 |
| 4 | 2.1 | 2.11 | 0.157 |

Comparing these data with that shown in Table 1, it is apparent that indeed a most significant improvement has been made. For now not only is it possible to reduce the density and keep the K factor substantially the same, but it is also possible to reduce the K factor. The advantages of this are readily apparent.

Additional tests were performed to determine the hydrolytic stability of the new foam. The tests were conducted on samples for densities below 2 lbs./cu. ft. by subjecting them to high humidity conditions of 100 R. H. and 100° F. Samples made of the conventional unmodified foam heretofore used were characterized by serious deformation under these conditions. However, even with densities on the order of about 1.4 lbs./cu. ft. and the same conditions, foams prepared in acordance with the instant invention did not deform.

The ordinary method of making cellular polyurethane of foamed polyester diisocyanate reaction products as illustrated by the foregoing examples is usable herein. A viscous, liquid polyol is pumped at a controlled rate through a nozzle. An organic polyisocyanate, preferably a polyisocyanate having at least two isocyanato groups, is pumped at a sufficient pressure to the nozzle where it contacts the stream of polyol and is caused to thoroughly mix therewith by effecting a turbulent action. A small amount of water may be introduced either as a stream or in admixture with polyol if this mechanism is to be used to effect foaming. A suitable cross-linking agent, such as 1,3-propylene glycol, and a reaction catalyst, such as certain alkyl amines, i.e., triethylene diamine, are also generally mixed with the polyol or introduced into the nozzle along with surfactant in order to insure uniform and minimum cell size. If a liquefied halogenated gas is used, it is added in a similar manner. A stirrer is also generally present in the nozzle to insure homogeneous mixing. From the nozzle, the material is introduced into a suitable mold or cavity, which is preferably moved in a continuous manner relative to the nozzle to provide the desired layer of viscous reactants on the bottom of the mold. In situ foaming may be effected in a similar manner.

Polymerization starts as the materials are mixed and the semi-fluid mass is discharged from the nozzle. The mixing of the material is very important. It is important that the diisocyanate and catalyst be almost immediately and completely dispersed in the polyol. The rate of polymerization is relatively fast and the mass is shaped by the contour of the mold or cavity. Carbon dioxide or other gas is evolved in the gaseous state from the time of mixing so that the bubbling and frothing occur during the mixing, discharging and shaping states. The resultant foamed product can thereafter be heated to fully cure the product if necessary. As illustrated in the examples, a method commonly used at present involves the preparation of a quasi or partial prepolymer by reacting all the TDI (toluene diisocyanate in several isomeric mixtures) or other polyisocyanate needed for a particular formulation with part of the polyol under controlled conditions to give one package or component. The other component comprises the rest of the polyol and all the other ingredients. This method offers the following five outstanding advantages:

(1) The difference in viscosity between the two components is much smaller than if plain TDI is used, and therefore, blending and reaction are rapid.

(2) This partial reaction increases the degree of cross-linking.

(3) It allows the incorporation of functional groups impossible otherwise. For example, if a certain acid or polyol imparts certain desirable properties when formulated into the polyester, but gives a polyester of extremely high viscosity which is impossible to handle, the quasi-prepolymer could be made from such a polyester with a workable viscosity, while the balance of the polyol in the formulation could be made from another polyol with workable viscosity (thus introducing partially the desired properties into the macromolecule).

(4) Due to the great ease of preparing the given prepolymer, the one-shot system in the rigid series offers little advantage.

(5) The prepolymer reduces the exotherm during the foaming step and lessens the chance for scorch in a large block of foam.

The two components previously described are metered and pumped very accurately to a mixing head. Here, they are mixed at high speed and the foaming mass poured into the mold or cavity to be filled. If spraying is desired, a two-component spray gun is used instead of the mixing head, and air is blown usually at 60 to 110 cubic feet per inch. As expected, every application requires specific conditions, reaction rates, etc., and these can be met by the proper selection of ingredients as herein outlined.

If batch operation is desired, the two packages are poured into a container and mixed rapidly, using a fast motor or similar means. The foaming mass then is poured into the cavity or mold.

It is an important feature of this invention to employ one of the polymerizable foam ingredients, i.e., the polyisocyanate or polyol, or both as the solvent for the wood resin additive. The addition of a non-polymerizable solvent would exhibit a plasticizing effect on the finished foam article which would seriously affect its dimensional stability, particularly of low density products, at elevated temperatures and may also cause foam collapse and shrinkage of the foam at room temperature.

The foam composition used herein contains several ingredients which may be described as follows.

In rigid foams the polyol should be a polyester with a relatively large number of active or labile hydrogen atoms per molecule. A high degree of cross-linking is likewise necessary. In general, polyesters are made from alcohols such as trimethylol ethane, trimethylol propane or glycerol, and acids, such as adipic, phthalic, sebacic, maleic, dimer acid, etc. Recently, polyethers with the proper molecular weight, degree of cross-linking, and number of reactive hydrogen atoms per molecule have been made available. The properties to be obtained are determined chiefly by the formulation and choice of polyol.

The type of polyesters or polyethers to be used depends upon the kind of foamed product desired. In general, cross-linking type polyesters with a relatively high hydroxyl number, i.e., over 250, are used for rigid foam, while more linear polyesters with molecular weights from about 1500 to 2500, and a relatively low hydroxyl number, e.g., 50 to 150, are generally used for producing flexible polyurethane foams. However, because of the solvent effect of the blowing agent dissolved in the polyester, we may also use higher molecular weights such as 3000 or even somewhat higher.

A typical polyester used for the production of flexible foam products is one that is composed of the reaction product of one mol adipic acid and one mol of diethylene glycol with about an additional 1/30 mol of trimethylol propane, which is added to provide for cross-linking during the reaction with the diisocyanates. The viscosity of a typical polyester mentioned here is preferably held between about 1000 and 1200 cps. at 73° C. The moisture content is below 2 percent and preferably between 0.3 and 0.5 percent. The specific gravity of this polyester is generally about 1.19 at 25° C., and it has predominantly hydroxyl end groups and a hydroxyl number of about 60.

Polyesters used for the manufacture of rigid polyurethane foams are generally of the relatively higher cross-linking type and preferably have molecular weights of 2000 to 3000, although those with molecular weights as high as 4000 may be used. The hydroxyl percent is preferably about 7 to 20, the specific gravity is about 1.10 to 1.19, and the viscosity is about 2500 cps. at 73° C. One example of this type of polyester is composed of the reaction product of 2.5 mols adipic acid, 0.5 mol phthalic anhydride, and 4.2 mols of hexane triol. Another example of a polyester of this type would be one composed of the reaction product of 3 mols adipic acid, 2.1 mols hexane triol, and 2.1 mols 1,4-butanediol.

A more rigid and consequently less heat-sensitive foam can be formed if some multifunctional groups (more than two) are introduced, each containing at least one labile hydrogen atom. Accordingly, if an alkyd-type resin is formed by using a trifunctional glycerol with a bifunctional acid, such as adipic acid, a rigid product is produced by reacting the above with a diisocyanate and polymerizing, the labile hydrogen atoms of the free hydroxyl groups of the polyester resin cross-linking with the isocyanate molecule, thus producing a three-dimensional molecule.

All or part of the polyester may be substituted by various polyethers. Suitable polyethers are those used herein in the examples. These are generally polyalkylene ether glycols, such as polyethylene glycol, propylene glycol and mixtures thereof. These materials preferably have a molecular weight of above 700, but compositions possessed of molecular weights as low as 500 or as high as 10,000 or higher may be employed dependent on the desired ultimate product. Additional polyethers which are suitable are polytrimethylene ether glycol, polyneopentylene ether glycol, polypentaneethylene ether glycol and others and mixtures of these.

For several reasons, including reactivity, cost, ease of handling, and toxicity, TDI (toluene diisocyanate in several isomeric mixtures) is the preferred polyisocyanate. However, other materials, such as bitolylene diisocyanate, meta phenylene diisocyanate, p,p'-diisocyanate diphenylmethane and others are within the scope of the instant invention.

The reaction rate is dependent on catalyst activation. Basic salts, tertiary amines, and acetylacetonate of metals of the eighth group in the Periodic Chart of the Elements commonly are used. The use of a catalyst is generally found to have a great effect on humidity, aging and other properties. Cyclic structures containing only nitrogen and carbon have also been found to provide excellent results in this regard. Benzoid or ring unsaturation, such as that offered by the pyridine structure, are preferred when flexible foams are desired.

Foam formulations incorporate surfactants, which are very important in determining porosity, cell structure, and cell size. In carbon dioxide-blown foams, non-ionic surfactants commonly are used satisfactorily. However, in fluorocarbon-blown foams, it is necessary to blend the gas very thoroughly into the reactive mass, and silicones are preferred.

Flame retardants, such an antimony trioxide and tris-beta-chloroethyl phosphate can be incorporated to make the foam self-snuffing.

It is preferred that a liquefied halogen substituted alkane be used as the foaming agent. Such a material generally should contain at least one fluorine atom in its molecule in liquid form, having a boiling point at one atmosphere pressure not lower than −60° F. and not higher than 80° F., said blowing agent being chemically inert to the reactants under the conditions of the reaction. However, carbon tetrachloride, chloroform, methyl chloride and other gas producing materials outside this preferred group are within the scope of this invention. It should be noted in the process of the invention that, when water is present, part of the blowing action would be caused by the reaction of the water with isocyanate groups.

If a blowing agent is used that is insoluble in reactants or has a solubility of less than 0.1 mol/g., it should have a boiling point of not less than −10° F. and not above the temperature reached in the early part of the urethane-forming reaction, and preferably not appreciably above 75° F. The non-soluble liquid should be dispersed as fine globules in the polyester or other reactant used, and it should be relatively stable. The finely dispersed globules of the blowing agent will provide for a relatively uniform end-product. When the blowing agent is soluble in the polyester, it may, because of this solubility, have a much lower boiling point at atmospheric pressure. The higher the solubility, the lower may be the boiling point, and liquefied gas, having a solubility of at least 0.25 mol/g. at atmospheric pressure in one of the reactants (preferably polyester or a material of similar chemical composition, such as diethylene glycol acetate), may have a boiling point as low as −60° F. to give good properties. Generally, some of the advantages are obtainable whenever the solubility of the blowing agent is in excess of 0.1 mol/g. in the polyester or similar material and the boiling point is above minus 60° F. and not in excess of 50° F.

The group of halogen modified liquefied gases include the fluorochloromethanes made and sold under the trademark Freon by E. I. duPont. Various property variations are obtainable as the gases are sold with various degrees of substitution. A series of aliphatic fluoro- and fluorochloro compounds are also operable within the scope of this invention. Other commercially avaiable materials are likewise contemplated.

Among the various materials which may fall within the scope of the instant invention as modifiers are wood resins, such as the aliphatic hydrocrabon-insoluble solid portion of wood extract from the destructive distillation of wood, raw and hexa treated, heat bodied and air blown wood resin, tall oil pitch, esters of tall oil and esters of wood resin, polymerized wood resins, and similar pitches or residues. However, it is understood that the actual results desired will dictate the selection, and in some cases, certain materials will be inapplicable. The material is generally solid or semi-solid at room temperature with a minimum pour point of 50° F. It should be understood that the higher the softening point for the modifier, the higher the service temperature of the ultimate foam. The net effect is that any plasticizing effect of the resin is not encountered until the softening point is approached. Thus, if it is not reached during service, there would not be any detrimental influence from the resin. Still further, some chemical bond fostered by the resin with the polyisocyanate also deters its plasticizing effect. The material selected as the modifier should be non-water-soluble and resistant to water vapor transmission. The importance in selecting a solid or semi-solid material which is reactive is to provide closed cell formations wherein the wood resin does not affect the stability of the urethane foam matrix and deters collapse of the cells.

Of all the types of resinous materials used, the wood resin derivatives having softening points greater than 160° F. are preferred. Examples of preferred materials are Vinsol, Belro and plasticized Vinsol resins, Solo resin, and Crosby 900 resin.

The Vinsol resin is a hard, brittle, dark colored, thermoplastic resin derived from pine wood. It has a specific gravity of 1.218 (20° C.), a softening point of 234–239° F., a flash point of 455° F. and an acid number of 93. It is largely insoluble in petroleum solvents, soluble in alcohols, ketones and esters, and partly soluble in aromatic hydrocarbons. This is a high melting resin obtained from the first cut from solvent extraction during the destructive distillation of Southern pine wood. Vinsol is a complex mixture of many components, including acidic phenolic materials in the form of high molecular weight phenols and carboxyl-substituted phenols. It also contains acidic materials derived from resin acids and oxidized resin acids. High molecular weight neutral compounds are present, apparently derived from resinous and polymerized terpenes. Some wax is also present. In addition to the carboxyl and phenolic hydroxyl groups, there are present in Vinsol double bonds and active hydrogens which make many reactions possible.

The Belro resin is a similar material, non-crystalline in nature. It has a specific gravity of 1.138, a softening point of 187° F., a flash point of 410° F. and an acid number of 119. It is 60% gasoline insoluble, partly soluble in aliphatic hydrocarbons and carbon tetrachloride and soluble in ethyl acetate, alcohol, acetone and aromatic hydrocarbons. It is a dark colored, thermoplastic acidic resin. It is comprised of the usual resin acids present in resin, oxidation and polymerization products of these acids and of terpenes, and a minor amount of the colored and neutral constituents associated with wood resins. It has an acid number in the 120 range. It is obtained from the last cut from the solvent extraction during the destructive distillation of wood.

The Crosby 900 is a dark colored, thermoplastic, acidic resin recovered from the wood resin refining process which is then carefully subjected to controlled heat treatment in which a reduction in acid number and an increase in melting point and a reduction in petroleum naphtha insoluble content has been brought about. Its typical analysis is an acid number of 70, a melting point of 215° F., petroleum naphtha insolubles of 40 percent, saponification number of 110 and unsaponifiable matter of about 30 percent. It is chemically similar to the Vinsol and Belro resins.

The Solo resin is also a dark colored, thermoplastic, acidic resin recovered from the wood resin refining process. It has a softening point of about 244° F. and an acid number of approximately 90. It likewise is chemically similar to the other resins. Its typical analysis is an acid number of 97, a melting point of 244° F., petroleum solvent insoluble of 94.0 percent, saponification number of 148 and unsaponifiable matter of about 13.0 percent.

Tall oil pitch is obtained as a residue from the distillation of tall oil. It has an acid number of from 55 to 75 and a softening point of about 100° F. It contains about 50 percent fatty acids, 25 percent rosin acids, and about 25 percent other organics, such as sterols, higher alcohols, etc.

The amount of Vinsol that could be incorporated was limited due to its effect on the viscosity of the system. The largest amount that could be added was about 10 percent on the polyol weight. Tall oil pitch was also tried and could be added at almost any percentage. As much as 145 percent on the polyol weight was used in one foam. The Belro resin could be added at 100 percent or more on the polyol weight. Of the resins which could be added in amounts large enough to effect a cost reduction, the ones having softening points greater than 160° F., such as those mentioned above, give the best over-all properties.

To achieve a low-cost, low density foam within the scope of this invention, about 2 to 50 percent wood resin may be added based on the weight of the urethane foam ingredients, with 20 to 35 percent being preferred.

It should be noted that while this invention is primarily concerned with rigid closed cell structures, successful open cell materials have been made which are likewise characterized by the low cost advantage. Particularly notable are those derived from the use of a tall oil pitch additive and which can be added in amounts in excess of 50 percent by weight of the active foam ingredients.

The above-mentioned systems have been set forth in Table 1. The raw material cost per pound proved to be attractive and made these foams competitive with other commercially available foams. This is important because it allows one to increase the density to a level which compensates for the reduced physical properties occurring when modifiers are introduced, while still enjoying a cost advantage. The K factor of these foams was also better than unmodified polyurethane foam of equal densities. All of the systems listed in Table 1 required a degree of post-curing. This post-cure is necessary because the foam tends to shrink away from the mold when cooling. This is caused by the contraction of the resinous modifier as it solidifies. If the foam is kept warm until maximum blow and cure has taken place, this shrinkage no longer occurs.

The above-mentioned wood resin systems gave the best over-all results of any of the low-cost formulations investigated. The lower K factor can be attributed to two reasons. First, it is felt that the resin acts as a surface-active agent resulting in smaller and more uniform cell size, and secondly, the resin itself helps form a more impermeable cell wall, hence entrapping the blowing agent and retaining it better.

Due to the extremely good density and K factor characteristics, the subject polyurethanes have found exceptional adaptation in many uses. The unique properties of the urethane foamed in situ, coupled with the other properties outlined above including ease of fabrication and good adhesion, has prompted innumerable uses.

The greatest appplication for the foamed in situ polyurethane, as well as all the polyurethanes, is in structural uses, such as in sound and heat insulation. Sandwich panels with light, strong urethane cores are excellent construction materials. All types of cavities and the most complex of interstices are fillable with the urethanes. Wide application has been found in home construction, particularly in wall and ceiling structures. Likewise the trucking and automotive industry is a good outlet for the lightweight insulation. For example, refrigerated trucks, air conditioning units and the like may use the materials to advantage for their insulating properties. Additional uses of the modified composition may be made in the packaging industry. Many other uses have been found for this material, and it would appear that the extent of its applicability is far from being determined.

CONCLUSION

It is therefore seen from the foregoing description that new polyurethane foam compositions possessed of new and unexpected properties are now available. More particularly, it is now possible to produce polyurethane foam compositions modified by wood resin products with resulting foams characterized by low K factors at densities below 2 lbs./cu. ft., said K factors being comparable with those of 2 lbs./cu. ft., by improved hydrolytic stability at similar low densities and by a remarkable lowering in cost for a given amount of insulating value. The contribution to the thermal insulation field is significant.

It is believed the above provides a complete description of the invention in such manner as to distinguish it from other inventions and from what is old, and provides a description of the best mode contemplated of carrying out the invention and thereby complies with the Patent Statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What we claim is:

1. A polyurethane foam prepared in the presence of a substantially petroleum hydrocarbon insoluble pine wood resin.

2. A low density polyurethane foam having a density of about two pounds per cubic foot and a K factor less than 0.3 B.t.u.-inch/hour ft.$^2$ F. ° extended by a wood resin having a softening point of at least 160° F. partially chemically reacted in the foam matrix.

3. A polyurethane foam having a density less than two pounds per cubic foot and a K factor less than 0.3 B.t.u.-inch per hours ft.$^2$ F.° extended by a wood resin in the amount between 0.5 and 35 percent of the total weight of the foam partially chemically reacted in the foam matrix.

4. A polyurethane foam having a density less than 2 pounds per cubic foot and a K factor less than 0.3 B.t.u.-inch/hr.. ft.$^2$ F.° extended by a wood rosin residue from the destructive distillation of soft pine partially chemically reacted with the foam matrix.

5. A polyurethane foam having a density less than 2 pounds per cubic foot and a K factor not greater than 0.15 extended by a wood resin having a softening point of at least about 160° F. partially chemically reacted in the foam matrix.

6. A method of preparing a low density polyurethane foam having a density on the order of 0.5 to 15 pounds per cubic foot, said method having the following as its principal steps: providing a foamable composition consisting essentially of an orgaic polyisocyanate having at least two functional isocyanato groups, a polyol selected from the group consisting of castor oil, a polyester, a polyether, and mixtures thereof, a blowing agent, and wood resin having a softening point of at least about 160° F., by solubilizing the wood resin, in an amount between 2 and 50% of the weight of the foam reactants, in at least one of the polyol and polyisocyanate reactants prior to combining the reactants, and thereafter mixing and reacting the ingredients to provide a low density foam having a density between about 0.5 and about 15 pounds per cubic foot.

7. A method as defined in claim 6 comprising solubilizing the wood resin in the polyol reactant.

8. A method as defined in claim 6 comprising solubilizing the wood resin in the polyisocyanate reactant.

9. A rigid polyetherurethane foam prepared in the presence of a substantially petroleum hydrocarbons insoluble pine wood resin.

References Cited

UNITED STATES PATENTS

| | | | |
|---|---|---|---|
| 2,962,183 | 11/1960 | Rill, Jr. et al. | 260—2.5 A |
| 3,095,386 | 6/1963 | Hudson | 260—2.5 A |

FOREIGN PATENTS

| | | | |
|---|---|---|---|
| 848,766 | 9/1960 | Great Britain | 260—2.5 A |

OTHER REFERENCES

Auslegeschrift, 1,044,323, Nov. 20, 1958, G–22415 IVa/22i.

Barringer "Rigid Methane Foams–11 Chemistry and Formulation," Du Pont Elastomer Chemicals Dept. Bulletin HR–26, April 1958, pp. 7–14 and 25–30.

DONALD E. CZAJA, Primary Examiner

D. J. BARRACK, Assistant Examiner

U.S. Cl. X.R.

260—24